UNITED STATES PATENT OFFICE.

ALWIN MITTASCH, CHRISTIAN SCHNEIDER, AND HUGO MORAWITZ, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

CATALYTIC AGENT.

1,215,396.          Specification of Letters Patent.       Patented Feb. 13, 1917.

No Drawing.          Application filed June 4, 1914.   Serial No. 842,959.

*To all whom it may concern:*

Be it known that we, ALWIN MITTASCH, CHRISTIAN SCHNEIDER, and HUGO MORAWITZ, citizens of the German Empire, residing at Ludwigshafen-on-the-Rhine, Germany, have invented new and useful Improvements in Catalytic Agents, of which the following is a specification.

We have discovered new catalytic agents by means of which catalytic reactions can be carried out in a very advantageous manner. Our new catalytic agents contain the elements of a metal of the platinum group and an aluminate silicate, and can be obtained by taking an aluminate silicate containing water, such as a natural zeolite, or an artificial zeolite, and replacing a part or the whole of the alkali metal or alkaline earth metal contained therein, by the platinum metal. The product obtained can be subjected to further treatment, without departing from our invention; for instance, it may be heated and reduced, and this reduction is desirable if the catalytic agent is to be employed for the hydrogenization of organic compounds. After such reduction, the catalytic agent contains a platinum metal in a metallic form and also the elements of an aluminate silicate.

The introduction of the platinum metal into the aluminate silicate can be effected for instance by digesting the alkali metal aluminate silicate, or other aluminate silicate, with a solution of a platinum metal salt. Or, the zeolite can either direct, or after being gently heated, so that some of the water is driven off, be soaked in a solution of a platinum metal salt, so that the platinum metal salt enters the zeolite, and some replacement of the alkali metal or alkaline earth metal by a platinum metal takes place, although the alkali remains in the mass.

Artificial zeolites are put on the market under the name of permutite, and are described in British Patent No. 23,706/12 and also in the article "On Artificial Zeolites" by Dr. Siedler on page 262 of the report of Section 2 of the Seventh International Congress of Applied Chemistry held in London in 1909.

Catalytic agents in accordance with this invention are very easily produced and are characterized by excellent activity, and by their use, the most varied operations, such for instance, as hydrogenization, reduction and oxidation can be carried out.

During the production and employment of our catalytic agents, they may undergo physical and chemical changes, and we wish to be understood as claiming the new catalytic agents, as above defined whether they may have undergone these changes or not.

The following example illustrates how one of our new catalytic agents can be prepared, but the invention is not limited to this example. The parts are by weight.

*Example.*

Digest 100 parts of the artificial zeolite, sodium aluminate silicate (such as the ordinary commercial granular sodium permutite found on the market) with a weak hydrochloric acid solution containing one-tenth of a part, to half a part, of palladium subchlorid, either at ordinary temperature, or while warming, until the solution is decolorized. If the catalytic agent is to be used for hydrogenization purposes, wash the mass well and dry it and, if desired, reduce it with hydrogen at, for instance, a slightly raised temperature say from 150° to 200° C., or with formaldehyde at a lower temperature. The catalytic agent which is obtained can be used (either directly, or after pulverization) for instance, for the hydrogenization, or dehydrogenization, of organic compounds, and, when liquids are treated, these can with advantage be allowed to trickle over the catalytic agent.

In this example, instead of sodium permutite, other aluminate silicate containing an easily replaceable base, or more than one easily replaceable base, can be employed, for instance, natural zeolites can be used, such as analcime, natrolite, chabasite.

In a similar manner, other platinum metal zeolites can be prepared, for instance, those of platinum itself and of rhodium, iridium, ruthenium and osmium. If desired, however, a platinum zeolite can be obtained by heating an artificial zeolite until more or less of the water has been driven off, and then soaking it in a solution of platinum hydrochlorid, drying and heating, whereupon, any soluble salts, such as sodium chlorid can be removed by washing or digesting. An osmium zeolite can be prepared by soaking a zeolite in a solution of potassium osmate, and then heating. If desired, the artificial or natural zeolite can first be converted into ammonium zeolite, and this either directly or after heating can be converted, for instance, into osmium zeolite, by suitable treatment with potassium osmate.

Now what we claim is:—

1. A catalytic agent containing the elements of a platinum metal and an aluminate silicate.

2. A catalytic agent containing the elements of a platinum metal and an alkali metal aluminate silicate.

3. A catalytic agent containing the elements of a platinum metal and a zeolite.

4. A catalytic agent containing the elements of a platinum metal and an aluminate silicate in a reduced form.

5. A catalytic agent containing the elements of a platinum metal and an alkali metal aluminate silicate in a reduced form.

6. A catalytic agent containing the elements of a platinum metal and a zeolite in a reduced form.

7. A catalytic agent containing the elements of palladium and an aluminate silicate.

8. A catalytic agent containing the elements of palladium and an alkali metal aluminate silicate.

9. A catalytic agent containing the elements of palladium and a zeolite.

10. A catalytic agent containing the elements of palladium and an aluminate silicate in a reduced form.

11. A catalytic agent containing the elements of palladium and an alkali metal aluminate silicate in a reduced form.

12. A catalytic agent containing the elements of palladium and a zeolite in a reduced form.

13. The process of producing a catalytic agent by causing a platinum metal to replace the whole or a part of the replaceable base of an aluminate silicate containing water.

14. The process of producing a catalytic agent by causing a platinum metal to replace the whole or a part of the alkali metal of an alkali metal aluminate silicate containing water.

15. The process of producing a catalytic agent by causing palladium to replace the whole or a part of the alkali metal of a zeolite.

16. The process of producing a catalytic agent by causing a platinum metal to replace the whole or a part of the replaceable base of an aluminate silicate containing water and then treating the product until the platinum metal is present in the metallic state.

17. The process of producing a catalytic agent by causing a platinum metal to replace the whole or a part of the alkali metal of alkali metal aluminate silicate containing water, and then treating the product until the platinum metal is present in the metallic state.

18. The process of producing a catalytic agent by causing palladium to replace the whole or a part of the alkali metal of a zeolite and then treating the product until the palladium metal is present in the metallic state.

In testimony whereof we have hereunto set our hands in the presence of two subscribing witnesses.

ALWIN MITTASCH.
CHRISTIAN SCHNEIDER.
HUGO MORAWITZ.

Witnesses:
CH. BECK,
T. ALEC. LLOYD.